No. 607,290. Patented July 12, 1898.
G. STEPHEN.
EXTENSION TABLE, SEAT, &c.
(Application filed Dec. 28, 1897.)
(No Model.) 2 Sheets—Sheet 1.
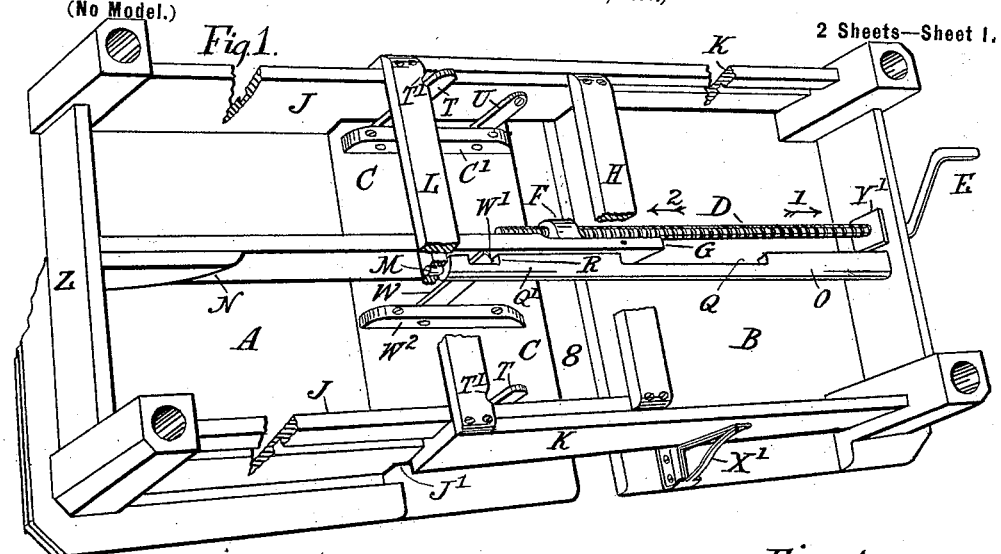
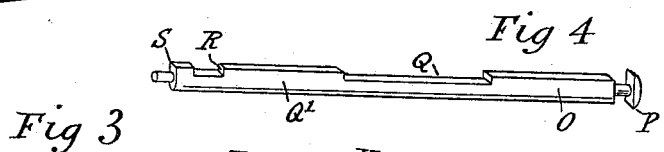
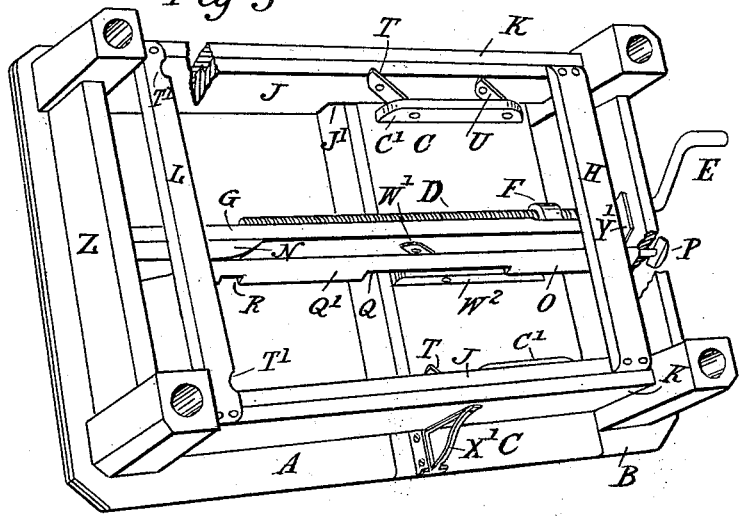
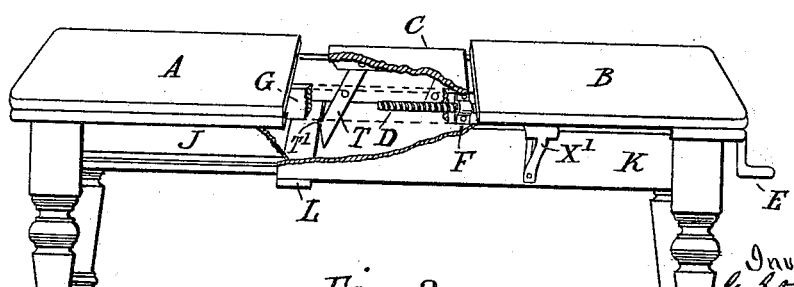

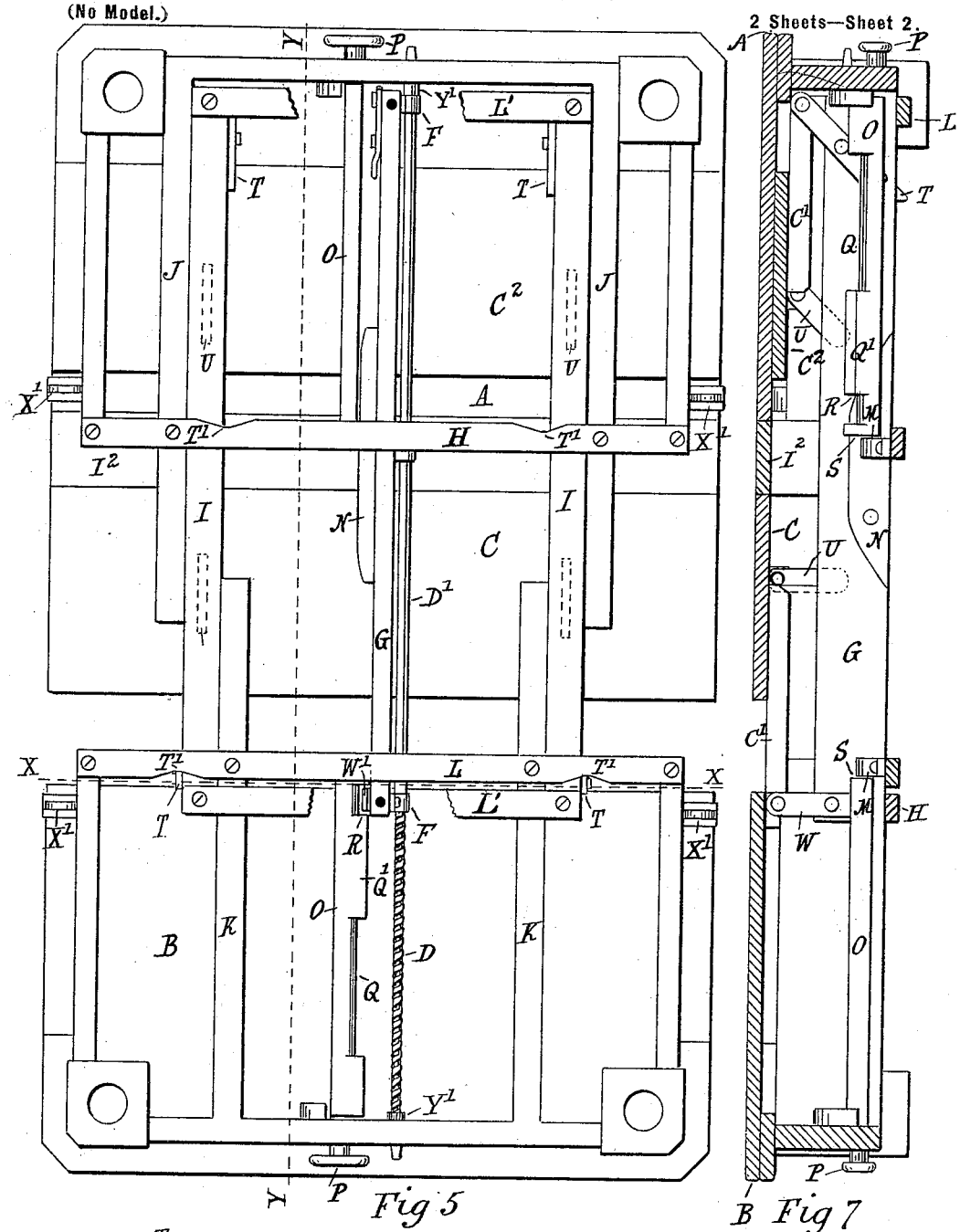

UNITED STATES PATENT OFFICE.

GEORGE STEPHEN, OF MELBOURNE, VICTORIA, ASSIGNOR TO GEORGE GARIBALDI TURRI, OF SAME PLACE.

EXTENSION TABLE, SEAT, &c.

SPECIFICATION forming part of Letters Patent No. 607,290, dated July 12, 1898.

Application filed December 28, 1897. Serial No. 664,014. (No model.) Patented in Victoria August 24, 1894, No. 11,638, and in England January 18, 1897, No. 1,351.

*To all whom it may concern:*

Be it known that I, GEORGE STEPHEN, a subject of the Queen of the United Kingdom of Great Britain and Ireland, and a resident of 159 Queen street, Melbourne, Victoria, have invented certain new and useful Improvements in Extension Tables, Seats, Berths, &c., (for which I have obtained a patent in Victoria, No. 11,638, dated August 24, 1894, and in Great Britain, No. 1,351, dated January 18, 1897;) and I do hereby declare that the following is a full, clear, and exact description of the invention, which will enable others skilled in the art to which it appertains to make and use the same.

My invention relates to the extension or reduction of the surface of various articles by the addition or withdrawal of a leaf or leaves which is or are attached to such articles, among which may be named tables, seats or benches, and berths, although there are also others to which the invention may be obviously applied.

In steamship-cabins and in passenger-cars on railways and wherever the utilization of space is of importance my invention will enable structures which at one time are expanded for use as berths to be reduced at other times, affording more floor-space.

Referring, by way of example, to tables, the tables would have the usual bed, consisting of two parts, and be also provided with a spare leaf or leaves permanently connected with the table, but which by means of novel mechanism may without being touched by the operator be caused to form a connection between the beds when the latter are drawn apart and may also be made to disengage from the beds and retreat under the table when the beds are to be closed together.

The accompanying drawings illustrate the application of my invention to extension-tables.

Figure 1 shows a view of the table in inverted position and illustrates the position of the movable leaf just before it begins to lower itself (from the bed to which it is joined) and retreat to the position shown in Fig. 3. Fig. 2 shows, on a smaller scale, the same table in natural position with the beds separated and the spare leaf moved out from below one of the beds and in the position at which it begins to rise up to the level of the beds and join one of them. Fig. 3 represents in perspective view a table in inverted position with the beds closed together and the spare leaf stored underneath. Fig. 4 shows a lowering-bar used in the lowering of the spare leaf and the closing of the table. Fig. 5 is a plan view from beneath of a double-leaf extension-table with one leaf in extended position, but with the gap unclosed between one of the beds and the spare leaf. Figs. 6 and 7 show, respectively, a cross-section on the line X X and a longitudinal section on the line Y Y of the table shown in Fig. 5.

In the drawings like parts are indicated by like letters of reference and parts of the figures are broken away or shown in section for greater clearness.

The only part handled by the operator to cause the table to extend and insert a spare leaf firmly in place is a portable key or handle E, which may be, as usual in extension-tables, engaged with the end of the screwed rod D. In order to cause the leaf to withdraw and allow the beds to close together, the operator works the handle and the end or knob P of the lowering-bar O when the said bar is provided.

Referring now to Figs. 1 to 4 of the drawings, A B are ordinary beds; C, a spare but movable leaf; F, a screwed nut through which D works, the said nut being fixed to framing under the table. As shown, it is fixed to G, which is merely a fixed bar secured to the part of the table which carries the leaf A; but F might be secured otherwise, as to the cross-rail H, which connects the slides J J, which also are fixed on the same part or end of the table, as A or G.

K K are slides attached to the B part or end of the table and connected by a bar L.

It is a known arrangement to provide tables with slides, as aforesaid, and with a screwed rod and a nut attached to the framing for the purpose of opening or closing the beds; but my slides possess novelty in that the upper edges of K K are at such a distance beneath the lower surface of the bed B that the leaf C may move freely between K and B, and the upper edges (see J', Figs. 1 and 2) of J J, in that part of each which is not under bed A, are also low enough to leave sufficient space for C between them and B when the table is closed.

I support the inner ends of the bed B at a proper fixed height above the slides by a bracket X' at each side, and this arrangement of beds, slides, and bracket-supports is in some cases used by me simply for storage of one or more loose leaves under the bed B, the space between B and K being made such as will receive the number of leaves to be stored.

The leaf C is connected (or strips C', attached to part C, are connected) on each side to the frame or slides J J by links T U, so arranged as to have a parallel motion. The links U are pivotally connected at each of their ends and besides having the said parallel motion act as supports to the leaf C when required, while each link T has in addition an extension or tail beyond one of the pivots, said tails being used to enable the links to be (by means of pressure) swung on their pivots and act as levers.

As the rod D is so arranged as to work against the usual extension-rod fitting Y', the action of turning the rod by handle E causes the rod to travel through nut F, (toward either the end at which is Y' or the opposite end of the table Z, as the case may be,) those connected parts shown by B, K, and L traveling also correspondingly to the travel of said rod. In this manner the beds A B are parted or closed together. The parts G A J U T C being all connected, when the beds A B become sufficiently parted the tails of the levers or links T meet or strike the stops or retarding-surfaces T' T' on framing connected with or projections from slides K K. The position is shown in Fig. 2. The tails of the pivoted levers T are preferably curved or cranked to facilitate their motion, and as the table continues to extend the surfaces T' T' continue to be forced against the levers, turning the latter gradually on their pivots until they have assumed an upright position, bringing the leaf C level with the bed A and fitting tightly against the same. In practice this motion is so exactly attained that dowel-pins in C enter corresponding recesses in A without difficulty. It will be found that when the leaf C has joined A a gap remains between B and C. This gap is eliminated by reversing the action of the screw D. Such reversal does not cause C to be moved away from A, but carries the parts D B K in the direction shown by arrow marked 2 in Fig. 1 until B meets C. The extension operation is then completed.

The mode of closing the table is almost equally simple. By operating handle E the leaf B is first brought away from C, as shown by arrow marked 1 in Fig. 1, thus giving sufficient clearance to enable C to be swung away from A and downward on its parallel pivots until the top C is below the under level of B. C may be thus swung down by handling it direct—that is, without using mechanism, such as a rod O.

The rod O (shown in Fig. 4) is provided with the shoulders R and S and is cut away, as at Q, on the side which when in operation slides against the bar G to reduce the surface in contact with the said bar, and consequently reduce the friction. The said rod O is journaled in one of the end pieces of the frame and provided with a knob P outside of the said end piece of the framing, and the said rod is journaled at its inner end in an eye secured to the cross-bar L, as shown at M in Fig. 1, thus allowing the rod to be turned upon its axis when necessary.

When the rod O is used, as I prefer, the leaf C should not be handled. Assuming that the rod O is used, the next movement after producing the gap (marked 8 in Fig. 1) between the parts B and C is to turn the rod O by means of the end or knob P from the position shown in Fig. 3 to the position shown in Fig. 1. When so turned, a surface R on the rod O is closed or carried in front of the surface W', which is the tail of a lever W, said lever being connected pivotally at its other end to the under side of leaf C or to an attachment thereto, W², as shown, and pivoted at a point intermediate of its length to the bar G or other suitable connection to the A part of the table. The motion of the screw D (vide Fig. 1) is then reversed, so as to advance D and its connected parts toward A, as shown by arrow marked 2, until the shoulder R of rod O strikes tail W' and swings the lever W around on its pivot, the said tail thus being raised and the upper end of lever W depressed (carrying with it the leaf C) until the upper surface of leaf C is below the lower surface of B. The first part of the closing operation—viz., the lowering of leaf C—having been effected, the screw is continued in motion, drawing beds A B together until they assume the position shown in Fig. 3. It will be observed that in this figure the bar O appears canted to a different position from that shown in Fig. 1. This canting is done automatically by means of a beveled canting-block N, fixed on the A end of the table in the line of motion of the end S of rod O. The block N is so adjusted as to strike with its bevel the shoulders S of the rod O at one side of its pivoted point M and close to the bar G. As the shoulder S of the rod O moves along the bevel of the block N the rod will be turned on its axis from the position shown in Fig. 1 to that shown in Fig. 3, thus leaving the lever W free to turn on its pivot. Should the block N be dispensed with, the rod O would have to be turned by hand to free the lever W before the two parts of the table could be closed against the leaf C when in its raised position, as otherwise the shoulder R would lower the leaf C, as hereinbefore described.

It will be obvious that the shoulder S on the rod O might be dispensed with and the block N so adjusted as to act on the surface R and produce the same result.

I find the broad part Q', Figs. 3 and 4, useful, as the end of tail W' must then slide along, resting in contact with such part, and thereby tends to keep the leaf C well down away from B.

In Figs. 5 to 7 is shown a modification in which there are two extension-leaves C and C² and in which a leaf or bed I² is supported on bars I between the parts A and B of the table and on a level with the top of these parts. In this instance the bars J, connected with the part A, are arranged to slide on the outer sides of the bars I, and the bars K, connected with the part B, are arranged to slide on the inner sides of the said bars I. The bars I are connected together at their ends by the bars L', thus forming a rectangular frame, and the bar G is secured at its ends to the bars L' and extends longitudinally through the middle of the said frame. Each end of the table is arranged to slide toward or away from the central piece I², and the leaves C and C² are placed one beneath each of the ends A and B of the table and so arranged as to be raised between the central piece I² and their respective ends of the table. The means for raising and lowering the leaves C and C² are exactly the same as described with reference to Figs. 1 to 4, a screw D and rod O being placed at each end of the table to operate that particular end, the nuts F and bevel-blocks N being secured to the central bar G. If desired, the screws D may be covered by a sheath D'. It will be obvious that the screws D may be omitted from either of the forms of table herein described and the tables may be drawn apart or pushed together by hand.

Various other slight modifications might be made in the device without departing from the spirit or sacrificing the advantages of my invention.

Having now particularly described and ascertained the nature of my said invention and in what manner the same is to be performed, I declare that what I claim is—

1. In an extension-table, the combination with the two end portions, arranged to slide toward or away from each other, and means for sliding the two end portions; of a movable leaf supported beneath one of the said end pieces, links pivoted to the framing and supporting the said movable leaf, a bar secured to the framing of the other part of the table in the path of the said levers, a lever W also pivoted to the movable leaf and to the framing, and a rod adapted to engage the end of the said lever W during the sliding movement of the parts, substantially as described.

2. In an extension-table, the combination with the two end portions arranged to slide toward or away from each other, and means for sliding the two end portions; of a movable leaf supported beneath each of the said end pieces, links pivoted to the framing and supporting the said movable leaves, bars secured to other parts of the framing in the path of the levers as the parts slide, and causing the levers to raise the movable leaves to the height of the top of the table, levers W pivoted to the said movable leaves and to the framing, and rods adapted to engage the said levers W, to lower the said movable leaves, substantially as described.

3. In an extension-table, the combination with the two parts, each part having a top, and side bars beneath the said top, the side bars of one part being adapted to slide upon the side bars of the other part, a central bar secured to one part; of a movable leaf arranged beneath the top and above the said bars, levers pivoted to the said movable leaf and to the said bars of one part, a cross-bar secured to the side bars of the other part in the path of the said levers, and means connected with the said central bar for sliding the two parts to cause the ends of the said levers to impinge against the said cross-bar and raise the movable leaf between the two parts of the table, substantially as described.

4. In an extension-table, the combination with a plurality of parts, each part consisting of a top leaf and longitudinal side bars connected thereto, the said bars being arranged to slide one upon another, of movable leaves arranged between the said top leaves and the said bars, levers pivoted to the said movable leaves, and to the said bars, cross-bars secured to other of the said bars in the path of the said levers, and means for sliding the several parts of the table to cause the said levers to impinge against the said cross-bars, and raise the movable leaves to the level of the top leaves, substantially as described.

5. In an extension-table, the combination with a plurality of parts, each part consisting of a top leaf and longitudinal side bars connected thereto, the said bars being arranged to slide one upon another, and an intermediate longitudinal bar secured to one of the parts between the said side bars; of movable leaves arranged between the said top leaves and the said bars, levers pivoted to the said movable leaves and to the said side bars, cross-bars secured to other of the said longitudinal bars in the path of the said levers, means for sliding the several parts of the table to cause the said levers to impinge against the said cross-bars, and raise the movable leaves to the level of the top leaves, levers W pivoted to the said movable leaves and to the said intermediate bar, and rods journaled in the frame and adapted to engage the said levers W to lower the said movable leaves, substantially as described.

6. In an extension-table, the combination with a plurality of parts, each part consisting of a top leaf and longitudinal side bars connected thereto, the said bars being arranged to slide one upon another, and an intermediate longitudinal bar secured to one of the parts between the said side bars; of movable leaves arranged between the said top leaves and the side bars, levers pivoted to the said movable leaves and to the said side bars, cross-bars secured to other of the longitudinal bars in the path of the said levers, means for sliding the several parts of the table to cause the said levers to impinge against the said cross-bars, and raise the movable leaves to the level of the top leaves, levers W pivoted to the said movable leaves and to the said intermediate bar, rods journaled in the frame and adapted to engage the said levers W to lower the said movable leaves, and bevel-surfaces on the said intermediate bar to engage the said rods and turn the latter away from the levers W at the proper times, substantially as described.

7. In an extension-table, the combination with a plurality of parts, each part consisting of a top leaf and longitudinal side bars connected thereto, the said bars being arranged to slide one upon another, and an intermediate longitudinal bar secured to one of the parts between the said side bars; of movable leaves arranged between the said top leaves and the said bars, levers pivoted to the said movable leaves and to the said side bars, cross-bars secured to other of the said longitudinal bars in the path of the said levers, screws journaled in the framing, threaded sockets in other parts of the framing to receive the said screws, means for turning the said screws to slide the several parts of the table to cause the said levers to impinge against the said cross-bars, and raise the movable leaves to the level of the top leaves, levers W pivoted to the said movable leaves and to the said intermediate bar, and rods journaled in the frame and adapted to engage the said levers W to lower the said movable leaves, substantially as described.

8. In an extension-table, the combination with two parts, each part consisting of a top leaf and longitudinal side bars secured thereto, the said bars being arranged to slide one upon another, and a longitudinal bar secured to one of the said parts; of a movable leaf arranged between the said top leaves and the said bars, levers pivoted to the said movable leaf and to the said side bars, cross-bars secured to other of the said side bars in the path of the said levers, means for sliding the two parts of the table to cause the said levers to impinge against the said cross-bars, and raise the movable leaf to the level of the top leaves, a lever W pivoted to the said movable leaf and to the intermediate bar, and a rod journaled in the frame and adapted to engage the said lever W, to lower the said movable leaf, substantially as described.

9. In an extension-table, the combination with two parts, each part consisting of a top leaf and longitudinal side bars secured thereto, the said side bars being arranged to slide one upon another, and a longitudinal bar secured to one of the said parts between the said side bars; of a movable leaf arranged between the said top leaves and the said bars, levers pivoted to the said movable leaf and to the said side bars, cross-bars secured to other of the said side bars in the path of the said levers, means for sliding the two parts of the table to cause the said levers to impinge against the said cross-bars, and raise the movable leaf to the level of the top leaves, a lever W pivoted to the said movable leaf and to the intermediate bar, a rod journaled in the frame and adapted to engage the lever W, to lower the said movable leaf, and a bevel-surface on the said intermediate bar to engage the said rod and turn the latter away from the lever W at the proper time, substantially as described.

10. In an extension-table, the combination with two parts, each part consisting of a top leaf and longitudinal side bars secured thereto, the said bars being arranged to slide one upon another, and a longitudinal bar secured to one of the said parts between the said side bars; of a movable leaf arranged between the said top leaves and the said bars, levers pivoted to the said movable leaf and to the said side bars, cross-bars secured to other of the said side bars in the path of the said levers, a screw journaled in the framing, a threaded socket on the intermediate bar to receive the said screw, means for turning the said screw to slide the two parts of the table to cause the said levers to impinge against the said cross-bars, and raise the movable leaf to the level of the top leaves, a lever W pivoted to the said movable leaf and to the intermediate bar, and a rod journaled in the frame and adapted to engage the said lever W, to lower the said movable leaf, substantially as described.

In witness whereof I have hereunto set my hand in presence of two witnesses.

GEORGE STEPHEN.

Witnesses:
   THOS. C. BARBOUR,
   G. G. TUNIS.